Patented Jan. 15, 1935

1,988,052

UNITED STATES PATENT OFFICE 1,988,052

PROCESS FOR CONCENTRATING CARBONATE AND OXIDIZED ORES AND MINERALS

Wilhelm Schäfer, Bochum, Germany, assignor to Erz- und Kohle-Flotation Gesellschaft mit beschrankter Haftung, Bochum, Germany No Drawing. Application January 26, 1933, Serial No. 653,751. In Germany July 1, 1931

15 Claims. (Cl. 209—166)

My invention relates to a process for concentrating carbonate and oxidized sulphide ores and minerals by flotation. It has hitherto been the practice in some cases to operate by superficially sulphurizing the metallic carbonates or metallic oxides by the addition of sulphurizing agents, such as colloidal sulphur, water-soluble sulphides, mercaptans or other organic sulphur compounds, and then subjecting them to flotation, as artificial sulphides. In other processes, the metallic carbonates or oxides are rendered flotable by the employment of alkali salts of the higher fatty acids. It is also known to make use of agents containing phosphorous, sulphur and carbon in conjunction, especially for sulphide minerals.

The practical performance of these processes is frequently attended with the inconvenience that the agents added to stimulate the flotation properties of the metallic carbonates or oxidized metallic sulphides, have a similar effect on the barren gangue. The result is that during the flotation of the metallic carbonates and oxidized metallic sulphides, a considerable portion of the affected gangue is also floated, and lowers the concentration of the metals that are to be separated so that only insufficiently enriched foam concentrates, contaminated with gangue are obtained.

The process according to the invention obviates these inconveniences, and consists in employing, for the flotation of carbonate and oxidized ores and minerals, nitrogen containing but carbon-free derivatives of thiophosphoric acids. The use of such additions restricts the flotation of gangue and increases the enrichment of metal in the foam concentrates.

Additions suitable for the purpose of the invention include, for example, the ammonium salts of the thiophosphoric acids, or complex amides of the thiophosphoric acids. Some of these substances are readily, and others sparingly, soluble in water. The chemical formulæ of several substances comprised in the group of the said agents, are given below:—$(NH_4)_2PS_2O_2$; $(NH_4)_3PSO_3$; $(NH_4)_3PS_3$; $(NH_4)_3P_2S_6$; $(NH_4)_4P_2S_7$ and also $PS(NH_2)(OH_2)$; $PS(NH_2)_2OH$; $PS(NH_2)_3$.

The agents are employed by adding them, in solid or dissolved condition, or as oil or as a suspension in an organic solvent, to the ore slurry under treatment. It is sometimes of advantage to make the addition during the fine crushing of the ores and minerals, or directly afterwards. The amount needed for the flotation process varies between 100 and 1000 grms. per ton of charge material, according to the character of the latter.

The agents can be employed by themselves, or in conjunction with other known flotation agents.

The following examples will serve to explain the effect of the invention.

1. In a flotation plant treating a complex lead-zinc ore, in dolomitic gangue, and containing up to about 25% of the lead in oxide combination, the former practice was to employ waterglass and potassium xanthate as reagents, and pine oil and wood-tar oil as flotation media, by which means a lead concentrated with 50–55% Pb, and a yield of 64–67% of the lead, was obtained. By operating in accordance with the invention and adding to the slurry 40–50 grms. of ammonium trithiophosphate per 1000 kg. of raw ore, the proportion of lead in the lead concentrate could be increased to over 60% Pb, and the yield to 73–74% Pb.

2. A flotation plant treated a lead carbonate ore with quartzose gangue containing a relatively high percentage of clayey components as bind. The reagents previously employed in the plant were sodium sulphide (as sulphurizing medium), potassium xanthate (as collecting medium) and pine oil and coaltar oil (as flotation media). Treated with these reagents, a raw ore containing about 3% Pb furnished a lead concentrate with about 50% Pb and, waste containing about 0,6% Pb.

On the addition of about 100 grms. of ammonium dithiophosphate to the aforesaid agents, the metal content of the separated lead concentrate increased to 55–60% Pb, whilst that present in the waste did not exceed 0,4% Pb. Thus the concentration was improved and the yield of lead increased by the addition of the ammonium dithiophosphate.

Apart from the foregoing examples, in which predominately carbonate and oxidized sulphide ores of lead were floated, the addition of derivatives of thiophosphoric acid containing nitrogen but free from carbon, has also resulted in the attainment of an increased proportion of metal in the flotation concentrates, and an improved yield of metal when applied to the flotation of carbonate and oxidized copper minerals, and other kinds of carbonated ores.

Having now particularly described certain embodiments of my invention,

I claim:—

1. A process for concentrating carbonate and oxidized ores and minerals wherein the fine-crushed ores or minerals are made into a pulp with water and subjected to a froth-flotation-process in the presence of a nitrogen containing but carbon-free derivative of a thiophosphoric acid.

2. A process for concentrating carbonate and oxidized ores and minerals wherein the fine-crushed ores or minerals are made into a pulp with water and subjected to a froth-flotation-process in the presence of a flotation agent and of a nitrogen containing but carbon-free derivative of a thiophosphoric acid.

3. A process for concentrating carbonate and oxidized ores and minerals wherein the fine-crushed ores or minerals are made into a pulp with water and subjected to a froth flotation-process in the presence of a solid nitrogen containing but carbon-free derivative of a thiophosphoric acid.

4. A process for concentrating carbonate and oxidized ores and minerals wherein the fine-crushed ores or minerals are made into a pulp with water and subjected to a froth-flotation-process in the presence of a nitrogen containing but carbon-free derivative of a thiophosphoric acid in dissolved condition.

5. A process for concentrating carbonate and oxidized ores and minerals wherein the fine-crushed ores or minerals are made into a pulp with water and subjected to a froth-flotation-process in the presence of a nitrogen containing but carbon-free derivative of a thiophosphoric acid, wherein the said derivative forms a suspension in an organic solvent.

6. A process for concentrating carbonate and oxidized ores and minerals wherein the fine-crushed ores or minerals are made into a pulp with water and subjected to a froth-flotation-process in the presence of a flotation agent and of a solid nitrogen containing but carbon-free derivative of a thiophosphoric acid.

7. A process for concentrating carbonate and oxidized ores and minerals wherein the fine-crushed ores or minerals are made into a pulp with water and subjected to a froth-flotation-process in the presence of a flotation agent and of a nitrogen containing but carbon-free derivative of a thiophosphoric acid in dissolved condition.

8. A process for concentrating carbonate and oxidized ores and minerals wherein the fine-crushed ores or minerals are made into a pulp with water and subjected to a froth-flotation-process in the presence of a flotation agent and of a nitrogen containing but carbon-free derivative of a thiophosphoric acid, wherein the agent forms a suspension in an organic solvent.

9. A process for concentrating carbonate and oxidized ores and minerals wherein a nitrogen containing but carbon-free derivative of a thiophosphoric acid is added to the ore or mineral before making it into a pulp with water.

10. A process for concentrating carbonate and oxidized ores and minerals wherein the ores or minerals are subjected to a crushing-process in the presence of a dissolved nitrogen containing but carbon-free derivative of a thiophosphoric acid; making the fine-crushed material into a pulp with water and subjecting it to a froth-flotation operation to separate the metals from the gangue.

11. A process for concentrating carbonate and oxidized ores and minerals wherein the ores or minerals are subjected to a crushing-process, adding to the fine-crushed material a nitrogen containing but carbon-free derivative of a thiophosphoric acid, making the ore or mineral into a pulp with water and subjecting it to a froth-flotation operation.

12. A process for concentrating carbonate and oxidized ores and minerals wherein the fine-crushed ores or minerals are made into a pulp with water and subjected to a froth-flotation-process in the presence of an ammonium salt of a thiophosphoric acid containing no carbon.

13. A process for concentrating carbonate and oxidized ores and minerals wherein the fine-crushed ores or minerals are made into a pulp with water and subjected to a froth-flotation-process in the presence of a flotation agent and of an ammonium salt of a thiophosphoric acid containing no carbon.

14. A process for concentrating carbonate and oxidized ores and minerals wherein the fine-crushed ores or minerals are made into a pulp with water and subjected to a froth-flotation-process in the presence of an inorganic complex amide of a thiophosphoric acid.

15. A process for concentrating carbonate and oxidized ores and minerals wherein the fine-crushed ores or minerals are made into a pulp with water and subjected to a froth-flotation-process in the presence of a flotation agent and of an inorganic complex amide of a thiophosphoric acid.

WILHELM SCHÄFER.